(12) United States Patent
Vollmer et al.

(10) Patent No.: US 8,616,155 B2
(45) Date of Patent: Dec. 31, 2013

(54) MILKING ARRANGEMENT FOR ANIMALS

(75) Inventors: Kerstin Vollmer, Enkoping (SE); Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 55 days.

(21) Appl. No.: 13/203,742

(22) PCT Filed: Mar. 2, 2010

(86) PCT No.: PCT/EP2010/052583
§ 371 (c)(1),
(2), (4) Date: Aug. 29, 2011

(87) PCT Pub. No.: WO2010/112284
PCT Pub. Date: Oct. 7, 2010

(65) Prior Publication Data
US 2011/0308469 A1  Dec. 22, 2011

(30) Foreign Application Priority Data
Apr. 1, 2009 (SE) .................................. 0950205

(51) Int. Cl.
*A01J 5/007* (2006.01)

(52) U.S. Cl.
USPC .................................. 119/14.04; 119/14.08

(58) Field of Classification Search
USPC ........... 119/14.01, 14.03, 14.04, 14.08, 14.14
See application file for complete search history.

(56) References Cited

U.S. PATENT DOCUMENTS

| | | | |
|---|---|---|---|
| 3,835,814 A | 9/1974 | Jacobs et al. | |
| 6,050,219 A | 4/2000 | Van Der Lely | |
| 6,883,461 B2 * | 4/2005 | Christensen | 119/14.02 |
| 8,074,600 B2 * | 12/2011 | Kallen et al. | 119/14.04 |
| 2006/0196431 A1 * | 9/2006 | Kaever et al. | 119/14.04 |
| 2006/0249083 A1 * | 11/2006 | Johansson et al. | 119/14.03 |
| 2008/0184936 A1 * | 8/2008 | Petterson et al. | 119/14.02 |
| 2009/0301396 A1 * | 12/2009 | Sundborger et al. | 119/14.02 |
| 2010/0180824 A1 * | 7/2010 | Bright et al. | 119/14.08 |
| 2011/0023795 A1 * | 2/2011 | Huls | 119/840 |
| 2013/0098295 A1 * | 4/2013 | Mulder | 119/14.02 |
| 2013/0112143 A1 * | 5/2013 | Mulder | 119/14.02 |

FOREIGN PATENT DOCUMENTS

| | | |
|---|---|---|
| EP | 0 689 762 A1 | 1/1996 |
| EP | 1 352 559 A2 | 10/2003 |
| SU | 649373 A | 2/1979 |
| SU | 1777728 A1 | 11/1992 |

(Continued)

OTHER PUBLICATIONS

International Search Report, dated Jun. 16, 2010, from corresponding PCT application.

(Continued)

*Primary Examiner* — Rob Swiatek
*Assistant Examiner* — Lisa Tsang
(74) *Attorney, Agent, or Firm* — Young & Thompson

(57) ABSTRACT

A milking arrangement for animals includes rotary platform (2), a driving mechanism (12) adapted to provide a rotary motion of the platform (2), milking stalls (3) adapted to house the animals (1) to be milked on the platform (2), a blocking system (11, 20, 25) for blocking selected milking stalls (3) on the platform (1) temporarily such that the animals (1) do not have access to the blocked milking stalls (3) during a period of time and the remaining non-blocked milking stalls will be used more frequently.

20 Claims, 4 Drawing Sheets

(56) References Cited

FOREIGN PATENT DOCUMENTS

| WO | 00/74472 A1 | 12/2000 |
| WO | 2004/004791 A1 | 1/2004 |
| WO | 2008/104416 A1 | 9/2008 |
| WO | 2008/154247 A1 | 12/2008 |

OTHER PUBLICATIONS

Supplementary International Search Report, dated Jun. 30, 2011, from corresponding PCT application.

* cited by examiner

MILKING ARRANGEMENT FOR ANIMALS

THE BACKGROUND OF THE INVENTION AND PRIOR ART

The present invention relates to a milking arrangement for animals, wherein the milking arrangement comprises a rotary platform, driving means adapted to provide a rotary motion of the platform, and milking stalls adapted to house animals to be milked on the platform.

In a conventional rotary milking parlour, the cows walk on to an annular rotating platform and enter a milking stall. An operator or a milking robot located on the outside or on the inside of the annular platform, attaches teat cups to the teats of the cows. The platform rotates usually continuously with a constant low speed. When a milking process is finished, a removing device removes the teat cups from the cows and the milked cows leave the milking stall and the platform.

When a milking arrangement comprising a rotary platform is used, the cow flow to the rotary parlour will vary during a twenty four hours period. Thus, all milking stalls on the platform will not be continuously occupied during periods of poor cow traffic to the milking arrangement. This is not effective and it may result in hygienic problems. During periods of poor cow traffic, certain milking stalls can be vacant during a relatively long period. If teat cups and milk lines in a milking stall are not in use during a period, they will not be rinsed by milk flowing through the milk lines. It is here a risk that remaining milk residues in the teat cups and in the milk lines constitutes a breeding ground for microorganisms such as bacteria.

SUMMARY OF THE INVENTION

The object of the present invention is to achieve a milking arrangement with a rotary platform which is operated in an effective manner.

This object is achieved by the rotary parlour initially defined, which is characterised in that the milking arrangement comprises a blocking system which is able to block selected milking stalls on the platform temporarily such that the animals do not have access to the blocked milking stalls during a period of time. Consequently, when the number of animals to enter the milking arrangement is small, the blocking system blocks a suitable number of milking stalls on the platform. Thereby, the remaining non-blocked milking stalls will be used more frequently and preferably substantially continuously. The teat cups and milk lines in the used milking positions will be rinsed by milk substantially continuously. Thus, the problem with remaining milk residues in the teat cups and the milk lines will not arise. Furthermore, a blocked clean milking stall will be still in a clean state. No cleaning work has to be done in the blocked milking stalls.

According to an embodiment of the invention, the blocking system comprises a blocking member arranged in a passage leading to at least one milking stall on the platform, wherein the blocking member is movably arranged between an open position, in which it allows an animal to enter the milking stall, and a closed position, in which it prevents an animal from entering the milking stall. Such a blocking member may be a movable gate, bar or any other kind of movable element. Said movable blocking member may be positioned outside the platform in a passage leading to at least one milking stall on the platform. Conventional rotary milking parlour comprises an entrance passage to the milking stalls on the rotary platform. The entrance passage comprises a movable gate which is open when a vacant milking stall on the platform arrives to a rotational position just in front of the entrance passage and the gate. Such an already existing gate may be used to block selected milking stalls on the platform. In this case, the gate will not open when a blocked milking stall arrives to the rotational position just in front of the gate. Alternatively, said blocking member is positioned on the platform in a passage leading to at least one milking stall. It is possible to use already existing components on platform to block a milking stall. Such components may be movable fence arrangement dividing the platform into milking positions or retention bars which in a closed position prevents an animal from leaving a milking stall on the platform. With a suitable design of such components, they may be controlled in a manner such that they also prevent an animal from entering a blocked milking stall.

According to a preferred embodiment of the invention, the blocking system comprises a control unit adapted to control the motion of blocking member. Such a control unit may be a computer or the like provided with software adapted to control the motion of the blocking member. The control unit may be adapted to estimate the number of animals to enter the milking stalls during a period of time and it may be adapted to control the blocking member such that it blocks one or several milking stalls on the platform when the number of animals to enter the rotary platform is smaller than a predetermined value. Preferably, the control unit blocks a relatively large number of milking stalls on the platform, when the number of animals to enter the milking arrangement is small. Thereby, the remaining open milking stalls will be used substantially continuously.

According to a preferred embodiment of the invention, the milking arrangement comprises a waiting area which the animals have to enter before they are allowed to enter a milking stall on the platform. Such a waiting area is possible to use in milking arrangements based on voluntary animal traffic or in parlours where batch milking is practised where an operator brings the animals to the waiting area. The waiting area may contain concentrated food. The supply of concentrated food results in an increased animal traffic to the milking arrangement. The control unit may be adapted to estimate the number of animals to enter the milking stalls by means of information from detection sensors which detects when an animal enters and leaves the waiting area. By means of such information, the control unit is able to calculate the numbers of animals in the waiting area and the numbers of animals to enter the platform during a future period of time. Alternatively or in combination, the control unit may be adapted to estimate the numbers of animals to enter the milking stalls by means of historical information about the visiting frequency of the animals. If batch milking is practised, a certain number of animals may be milked at predetermined times or with predetermined time intervals. The control unit may be adapted to estimate the numbers of animals to enter the milking stalls during a period of time by means of historical information about the visiting frequency for a corresponding period of time. The animal traffic to the milking arrangement is, for example, considerably lower during the night than during the day. The animal traffic to the milking arrangement varies even during different periods of the day and the night. Thus, it is possible to estimate the animal traffic to the rotary platform by means of statistical data for a herd with a good accuracy.

According to a further embodiment of the invention, the milking arrangement comprises detecting means adapted to detect if an animal, which has been milked in a milking stall on the platform, is unhealthy. Said detection means may detect the quality of the milk from the animals. The control unit may be adapted to receive information from said detecting means and to block the milking stall in which the unhealthy animal has been milked. The milking stall may be blocked until a complete cleaning process of the milking arrangement has been performed. The blocking system may be adapted to block a milking stall, when a certain animal has been milked in this milking stall. If, for example, an animal takes medicines, the milk from the animal may contain medicines. In this case, the milking stall may be blocked until a complete cleaning process of the teat cups and the milking conduits in the milking stall has been performed. The blocking system may be adapted to block a milking stall, when a component of the milking equipment in the milking stall, is out of order. By blocking milking stalls with components out of order, it is not necessary to immediately exchange or repair the component in the milking stall. The milking stall may comprise detecting means which automatically detects when a component is out of order. Alternatively, an operator may by means of a keyboard or the like control the control unit such that it blocks a milking stall which is out of order.

According to a further embodiment of the invention, the milking arrangement comprises a robot arm adapted to attach teat cups to animals positioned in a milking stall on the platform. In this case, the milking processes on the rotary platform may be performed automatically without any operator which manually attaches the teat cups to the animals. Preferably, the milking arrangement comprises a cleaning device by which it is possible to clean the teat cups in the milking stalls between the milking processes. Such a cleaning process may be performed after each milking process in a milking stall. Alternatively, it will be performed with predetermined intervals or when bad milk has been detected.

According to a further embodiment of the invention, said positioning means are adapted to position the animals in milking stalls on the platform with their heads in the vicinity of an inner periphery of the annular platform. In such a case, the animals may have an extension in a completely radial direction on the annular platform or be arranged in a herringbone pattern. In this case, the positioning means may comprise fence arrangements having a substantially radial extension on the annular platform dividing the platform into milking stalls. Alternatively, said positioning means are adapted to position the animals in milking stalls on the platform with their heads in the vicinity of an outer periphery of the annular platform. Such positioning means may be rotational fence members making it possible for an animal which enters the platform from the outer periphery to provide a turning motion such that it faces outwards in a milking stall on the platform.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
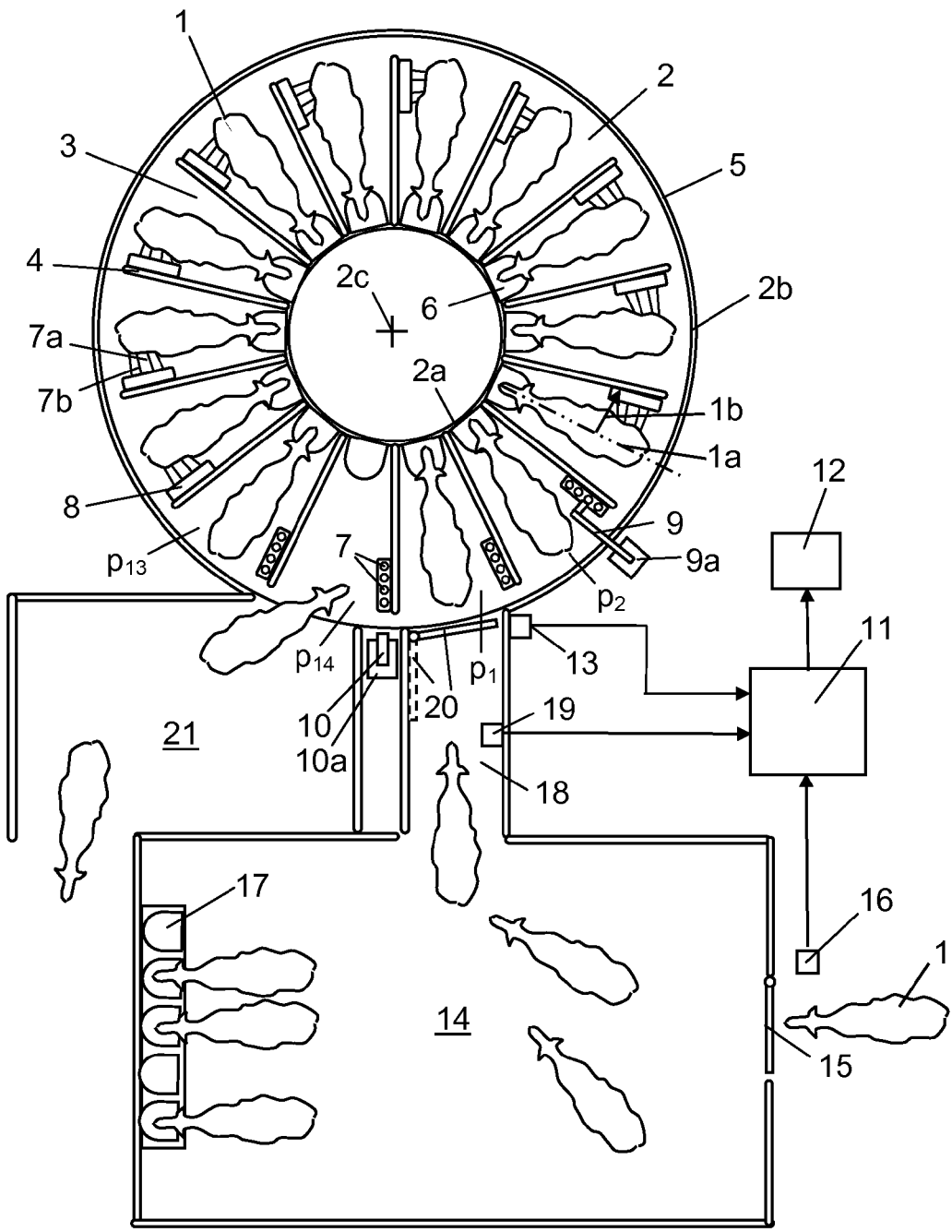
FIG. 1 shows a voluntary milking arrangement for milking of cows during a period of time when it is a large number of cows entering the rotary platform.
Figure 2:
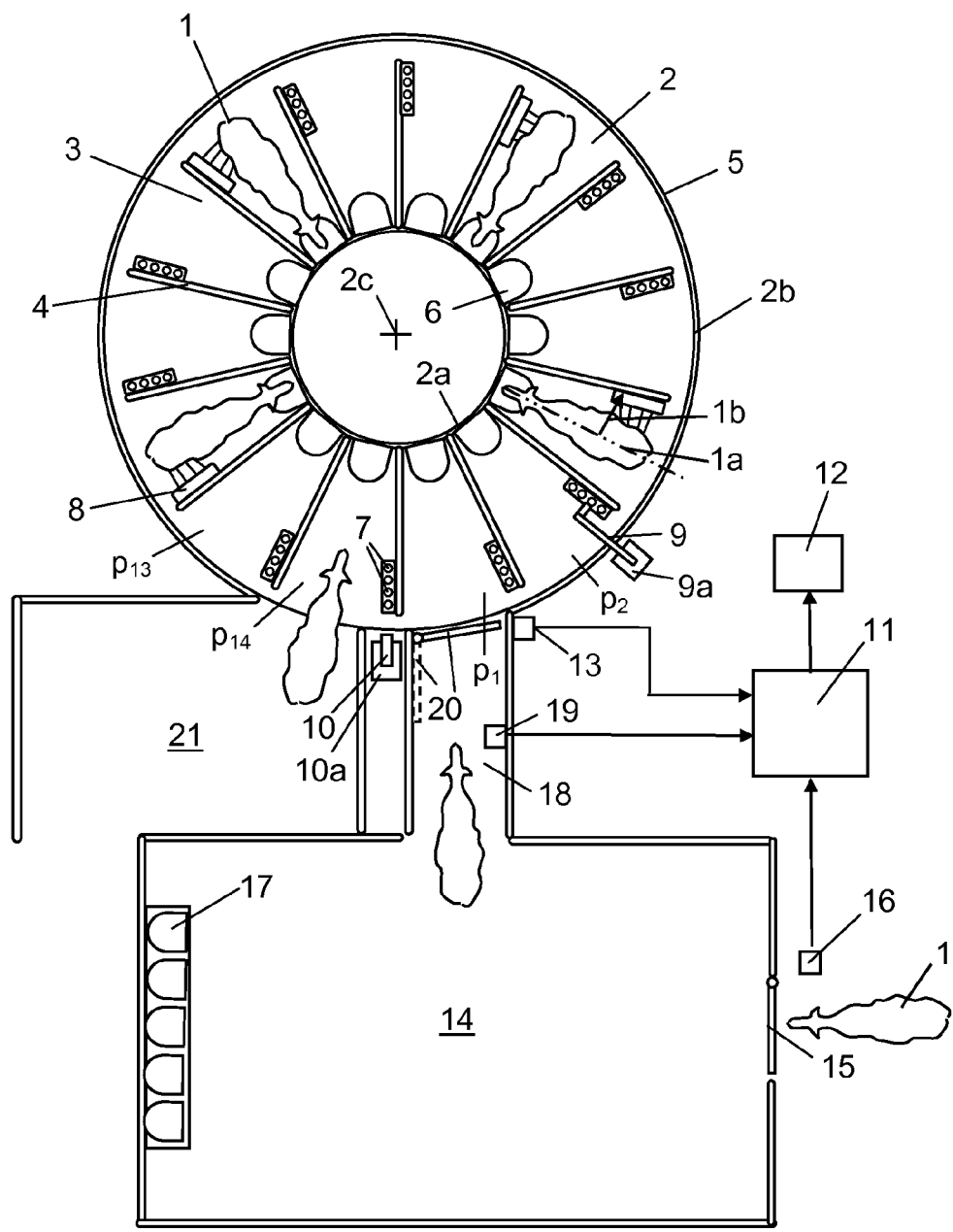
FIG. 2 shows the milking arrangement in FIG. 1 during a period of time when it is a small number of cows entering the rotary platform.

FIGS. 1 and 2 show a voluntary milking arrangement for milking of cows 1. The voluntary milking arrangement comprises a rotary annular platform 2 having an inner edge portion 2a and an outer edge portion 2b. The platform 2 rotates during operation around a vertical axis 2c. The platform 2 has an upper surface forming a support surface for the cows 1. A plurality of fence arrangements 4 are arranged on the upper surface of the platform 2. The fence arrangements 4 form milking stall 3 for receiving individual cows 1. The cows 1 are adapted to be milked in predetermined milking positions in the milking stalls 3. In this case, the fence arrangements 4 have an essentially straight radial extension on the platform 2 between an inner end located at the vicinity of the inner edge portion 2a of the platform and an outer end located at the vicinity of the outer edge portion 2b of the platform. The fence arrangements 4 are arranged at equal intervals around the annular platform 2. An outer fence arrangement 5 is mounted around a main part of the outer periphery of the platform 2. The outer fence arrangement 5 prevents that the cows 1 in the milking stalls 3 step backward and out of the platform 2 during a milking process.

Each milking stall 3 is provided with a feeding trough 6 arranged in the vicinity of the inner periphery 2a of the platform. Each milking stall 3 is also provided with a milking member to be attached to the teats of a cow 1 standing in the respective milking stall 3. In this case, the milking member comprises four separate teat cups 7. Each teat cup is provided with a milk conduit 7a and a pulsation conduit 7b. Each milking stall comprises a teat cup storing device 8 adapted to hold the teat cups 7 in a parked position when they are not in use. A base portion 9a of a robot arm 9 is arranged in a position outside the outer edge portion 2b of the platform 2. A base portion 10a of a cleaning device 10 is arranged in a position outside of the outer edge portion 2b of the platform 2 at a distance from the robot arm 9.

A control unit 11 is adapted to control a schematically shown drive mechanism 12 for driving of the platform 2. The drive mechanism 12 may include a drive wheel mechanism, which is arranged in contact with a circular rail on the underside of the platform 2. A position sensor 13 is adapted to sense the rotational position of the platform 2 and to send a signal to the control unit 11 about the actual position of the platform 2.

A closed area in the form of a waiting area 14 is arranged in connection to the platform 2. The waiting area 14 has an entrance gate 15 provided with a first identification sensor in the form of an identification sensor 16. A number of feeding stations 17 with concentrate food are arranged in the waiting area 14. The waiting area 14 has an outlet passage 18 provided with a second detection sensor 19 and a movable gate 20. An exit area 21 is arranged in connection to the platform 2. The exit area 21 is entered by the cows 1 when they leave the platform 2.

The rotary parlour arrangement comprises a blocking system which is able to block selected milking stalls 3 on the platform 2. The blocking system comprises the movable gate 20 and the control unit 11 which controls the motion of the movable gate 20. During operation of the milking arrangement, the control unit 11 is adapted to estimate the number of cowl to enter the platform 2 during a future period of time. In this case, the control unit 11 estimates the number of cows to enter the rotary platform by information from the first identification sensor 16 and the detecting sensor 19. In view of this information, it is possible for the control unit 11 to count the number of cows 1 in the waiting area 14. By means of this information, it is possible for the control unit 11 to estimate the number of cows 1 to enter the rotary platform during a future period of time. If the estimated number of cows 1 to enter the rotary parlour 2 is larger than a predetermined full capacity value, the control unit 11 concludes that the rotary platform has to be used with full capacity. In this case, the blocking system does not block any milking stalls 3 on the platform. If the estimated number of cows 1 to enter the rotary parlour 2 is smaller than the predetermined full capacity value, the control unit 11 concludes that the rotary parlour has not to be used with full capacity. In this case, the blocking system is adapted to block one or several milking stalls 3 on the platform 2. The number of blocked milking stalls 3 is related to the estimated number of cows 1 to enter the milking arrangement. FIG. 1 shows the arrangement during a period of time when a large number of cows enter the rotary platform 2 and the milking arrangement is used with full capacity. FIG. 2 shows the milking arrangement during a period when a small number of cows 1 enter the rotary platform 2. In this case, nine of fourteen milking stalls 3 are blocked by the blocking system. Preferably, the blocking system selects the milking stalls 3 to be blocked in a manner such that the milking stalls 3 in operation will be spread out around the platform 2 in an optimally manner.

A cow 1 wanted to be milked, walks to the enter gate 15 of the waiting area 14. The cow 1 carries a transponder containing data about the individual cow 1. The identification sensor 16 reads the transponder and sends a signal to the control unit 11 about the identity of the cow 1. The control unit 11 concludes if the cow will be granted a milking permission or not. If the cow 1 allows a milking permission, the gate 15 is open and the cow 1 enters the waiting area 14. If the cow 1 is not granted a milking permission, the gate 15 is not open and the cow 1 is not allowed to enter the waiting area 14.

In the waiting area 14, the cow 1 has possibility to eat concentrated food in the feeding stations 17 before walking to the outlet passage 18 leading to the rotary platform 2. The outlet passage 18 has a width such that only one cow 1 at a time can be located in a front position of the passage 18. The detection sensor 19 detects the cow 1 when it arrives to the front position of the passage 18 and sends a signal to the control unit 11. The gate 20 is in a closed position when the cow 1 arrives to the front position of the outlet passage 18. The control unit 11 receives substantially continuously information from the position sensor 13 about the actual rotational position of the platform 2. When a milking stall 3 arrives to a first rotational position $p_1$, just in front of the gate 20, the control unit 11 is adapted to decide if this milking stall 3 has to be blocked or not.

During a period of time when a large number of cows enter the milking arrangement, which is shown in FIG. 1, all milking stalls 3 are used on the rotary platform 2. In this case, the control unit 11 always opens the gate 20 for the cow 1 standing in the front position of the passage 18 as soon as a vacant milking stall 3 arrives to the first rotational position $p_1$. During a period of time when a small number of cows 1 enter the milking arrangement, which is shown in FIG. 2, only five milking stalls 3 are used in the milking arrangement. In this case, the control unit 11 keeps the gate 20 in a closed position until one of the five milking stalls 3 in use arrives to the first rotational $p_1$. In this case, it is possible that a cow 1 in the front position of the passage 18 has to wait a moment.

When the control unit 11 opens the gate 20, the cow 1 in the front position of the passage 18 enters the milking stall 3. The gate 20 is moved to its closed position as soon as the whole cow 1 is inside the milking stall 3. The feeding trough 6 attracts the cow and facilitates the positioning of the cow 1 in the milking stall 3. The feeding troughs 6 may be movably arranged. By setting the feeding trough 6 in a suitable position, it is possible to adjust the position of the cow 1 in the milking stall 3 to a desired milking position. In this case, the cows 1 are arranged in a milking stall 3 on the platform 2 such that a longitudinal axis $1a$ of the cows forms an angle of about 90 degrees to the direction of motion $1b$ of the cows 1 on the platform 2. The cows 1 stand here in a radial direction on the platform with their heads at the inner edge portion $2a$ of the platform 2 and a rear portion at the outer edge portion $2b$ of the platform 2.

When the milking stall 3 with the cow 1 has rotated to a second rotational position $p_2$, the robot arm 9 is activated and it fetches the teat cups 7 from the teat cup storing device 8 and attaches them to the cow 1. The platform 2 is driven with a slow speed such that it is no problem for the robot arm 9 to compensate for the relative motions between the cow 1 on the platform 2 and the robot arm 9 during the attaching process of teat cups 7 to the cow 1. The milking process of the cow 1 starts when all teat cups have been attached to the cow 1. A milk meter (not shown) supervises the milk flow during the milking process. As soon as the milk flow drops below a predetermined value, a removing device (not shown) removes the teat cups 7 from the teats of the cow 1. If the teat cups 7 have not been removed earlier, they are at least removed when the milking stall 3 reaches a thirteenth rotational position $p_{13}$. In the thirteenth position $p_{13}$, a treatment supplying device may spray a disinfecting medium or another kind of treatment medium to the teats of the cow 1 after that the teat cups 7 have been removed. Finally, when the milking stall 3 reaches a fourteenth rotational position $p_{14}$, the cow 1 leaves the milking stall 3 and enters the exit area 21. In the fourteenth position $p_{14}$, the cleaning device 10 is activated and it performs a cleaning process of the teat cups 7 when they are parked in the teat cup storing device 8. Such a cleaning process may be performed after each milking process. Alternatively, it will be performed with predetermined intervals or when bad milk has been detected. The cleaning device 10 may use a cleaning medium in the form of water, water with a detergent or any other kind of cleaning medium. Thereafter, the milking stall 3 will again be rotated to the first rotational position $p_1$ and be ready for receiving a new cow 1.

Figure 3:
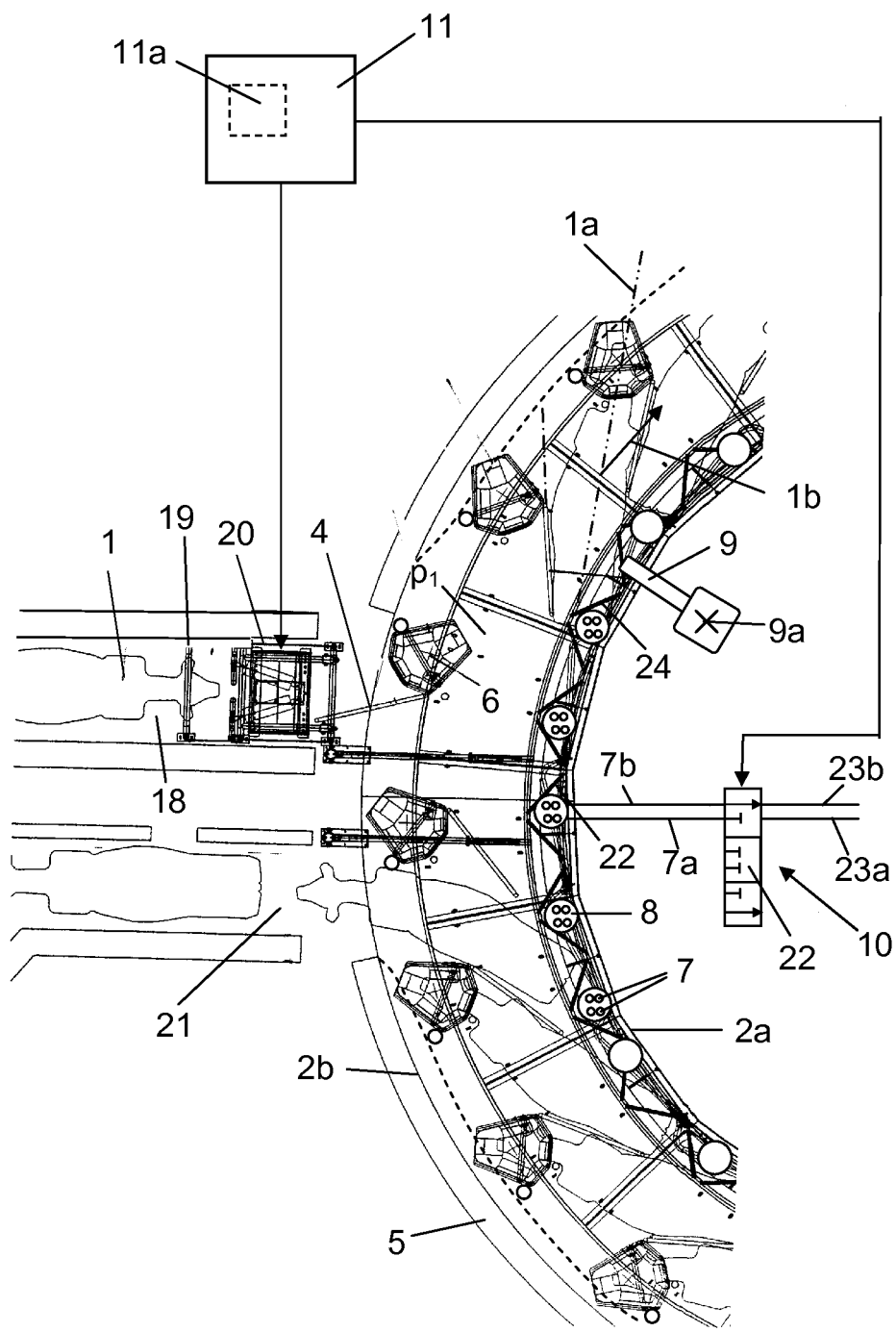
FIG. 3 shows an alternative embodiment of a voluntary milking arrangement for milking of cows and FIG. 4 shows a further alternative embodiment of a voluntary milking arrangement for milking of cows.

FIG. 3 shows a part of an alternative voluntary milking arrangement for cows 1. Rotatable fence members 4 are here used for dividing the platform 2 into milking stalls 3 for receiving individual cows 1 in predetermined milking positions. By the use of rotatable fence members 4, it is possible to position the cows 1 very close together on the platform 2. Each of the fence members 4 is fixedly connected to a feeding trough 6. A rumprail 24 is arranged at an inner edge portion $2a$ of the platform 2. The rumprail 24 prevents the cows 1 from accidentally falling or stepping out of the platform 2. In this case, the cows 1 are arranged on the platform 2 such that the longitudinal axis $1a$ of the respective cows forms an angle to the direction of motion $1b$ of the cows 1 on the platform 2 which is less than 90 degrees. The cows 1 are here arranged in a herringbone pattern on the platform 2. The head of the cows 1 are in an outer radial position of the platform 2 when they are standing in the milking stalls 3 on the platform 2. An entry passage 18 and an exit area 21 for the cows 1 are located adjacent to each other at an outer edge portion $2b$ of the platform 2. A milking robot arm 9 is here arranged in a position inside the inner edge portion $2a$ of the platform 2. Teat cup storing devices 8 are arranged on the platform 2. In this case, the teat cup storing devices 8 are arranged on one side of a cow 1 in a milking stall 3 and behind a cow 1 standing in an adjacent milking stall 3. When the cows 1 are arranged in a herringbone pattern on a platform 2, the above-mentioned space is normally empty. Therefore, it is very suitable to use this space for storing of the teat cups 7.

A cleaning device 10 is here arranged in a position inside of the inner edge portion 2a of the platform 2 at a distance from the robot arm 9. In this case, the cleaning device 10 comprises a so called backflush valve 22 which is positionable in three positions by means of a control unit 11. When the teat cups 7 are attached to a cow 1, the backflush valve 22 is in a first milking position in which it connects a pulsation line 23b of the milking arrangement to the pulsation conduits 7b of the teat cups 7. In the first milking position, the backflush valve 22 disconnects the milk conduits 7a of the teat cups 7a from a water line 23a of the milking arrangement. When the teat cups 7, for example, are attached or removed from a cow 1, the backflush valve 22 is positioned in a second position in which it both disconnects the pulsation conduits 7b of the teat cups 7 from the pulsation line 23b of the milking arrangement and the milk conduits 7a of the teat cups 7 from the water line 23a of the milking arrangement.

In a third washing position, the backflush valve 22 disconnects the pulsation conduits 7b of the teat cups 7 from the pulsation line 23a of the milking arrangement at the same time as it connects the water line 23b of the milking arrangement to the milk conduits 7a of the teat cups 7. In this case, water will flow from the water line 23b to the milk conduits 7a and out of the respective teat cups 7. The water flow removes possible milk residues in the milk conduits 7a and in the teat cups 7.

The milking arrangement comprises a blocking system adapted to block one or several milking stalls 3 and thereby one or several milking positions on the platform 2 during certain circumstances. The blocking system comprises also in this case a movable gate 20 and the control unit 11 which controls the gate 20. During operation of the milking arrangement, the control unit 11 is adapted to estimate the number of cows 1 to enter the platform 2 during a period of time. In this case, the control unit 11 estimates the number of cows 1 to enter the platform 2 by means of stored information 11a about how the milking frequency on the platform varies during a twenty-four hours period. During the night, the number of cows to enter the milking arrangement is normally low. During the day, the number of cows 1 to enter the milking arrangement is normally large but it could be smaller certain periods of the day. In this case, the control unit 11 comprises stored information 11a about the normal milking frequency during different periods of time of a twenty-four hours cycle for this platform 2. By means of this stored information 11a, it is possible for the control unit 11 to estimate the number of cows 1 to enter the rotary platform during different periods of the day and the night. If the estimated numbers of cows 1 to enter the rotary parlour 2 is larger than a predetermined full capacity value during a period, the entire capacity of the rotary parlour is used and the blocking system does not block any milking stalls 3 on the platform. If the estimated numbers of cows 1 to enter the rotary parlour 2 is smaller than the predetermined full capacity value, the control unit 11 concludes that the rotary parlour has not to be used with full capacity and the blocking system is adapted to block one or several milking stalls 3 on the platform 2. When a blocked milking stall 3 arrives to a first rotational position $p_1$ just in front of the gate 20, the control unit 11 does not open the gate 20.

Preferably, the milking arrangement is stopped during a period of the night when the number of cows 1 to enter the milking arrangement is as small as possible. When the milking arrangement is started after a complete cleaning process at this time, relatively few cows 1 want to be milked. Therefore, the control unit 11 blocks nearly all milking stalls 3 during an initial period of time after the complete cleaning process. One or two milking stalls 3 will, for example, not be blocked in this initial period of time. As the time goes, the number of cows 1 to enter the milking arrangement increases and the blocked milking stalls 3 are successively opened. During the main time of the day, all milking stalls 3 of the milking arrangement will be used. When the day is over and the number of cows 1 to enter the milking arrangement decreases, the milking stalls 3 will be successively blocked. Just before the complete cleaning process of the milking arrangement is performed, only one or two milking stalls may be used.

Figure 4:
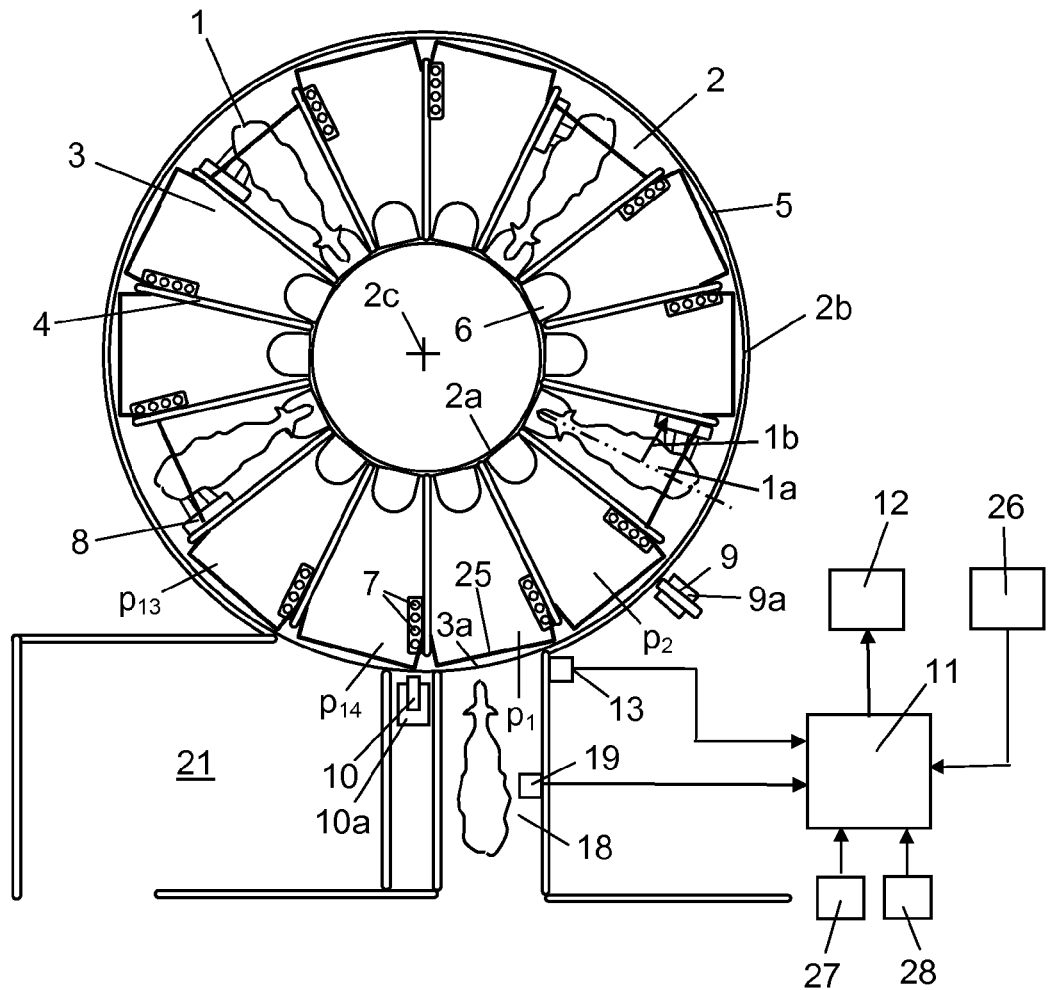

FIG. 4 shows a further embodiment of a voluntary milking arrangement. In this case, a blocking system comprises a control unit 11 and a movable gate in the form of a retention bar 25. The object of a retention bar 25 is to prevent a cow 1 from leaving a milking stall 3 after one revolution on the platform 2. The retention bar 25 is pivotally connected to fence arrangements 4 on opposite sides of the milking stall 3. A not shown operating cylinder turns the retention bar between a closed position and an open position. The retention bar is lowered behind a cow 1 in the milking stall in the closed position such that the retention bar 25 prevents the cow 1 from leaving the milking stall 3. The retention bar 25 is raised to a level above the cow 1 in the open position such that the cow 1 is free to leave the milking stall 3.

In this case, the blocking system uses the already existing retention bar 25 for blocking on or several milking stalls 3 on the platform 2. When it is a small numbers of cows to enter the milking arrangement, the control unit 11 positions the retention bar 25 in the closed position in the selected milking stalls 3 to be blocked. When such a blocked milking stall 3 arrives to the first position $p_1$ just in front of the passage 18, the closed retention bar 25 prevents a cow 1 in the front position of the passage 18 to enter the blocked milking stall 3.

In this case, the milking arrangement comprises a schematically shown first detecting means 26 adapted to test the quality the milk from a cow 1 in a milking stall 3. If the detecting means detects that the milk is good, the milk collected in a milk receiver in the milking stall is conducted to a milk tank. Otherwise, the milk in the milk receiver is refused or sent to a special milk tank. If the milk detecting means detects that the cow has mastitis or if there are bacteria in the milk, it is a risk that a following milked cow in the milking stall will be infected. If the detecting means 26 detects that the milk contains antibiotic or other medicines, the milk in the milk receiver is also refused or sent to a special milk tank. In this case, the control unit 11 also blocks the milking stall 3 until a complete cleaning process of the milking arrangement has been performed.

In this case, the milking arrangement comprises a schematically shown second detecting means 27 adapted to supervise the function of at least one component in the milking stalls 3, which is necessary for performing a milking process in the milking stall 3. If the component gets out of order, the control unit 11 receives information about this from the detecting means 27. In this case, the control unit 11 blocks the milking stall 3 until the component has been exchanged or repaired. It is also possible for an operator to manually control the control unit 11 such that it blocks one or several milking stalls 3 on the platform 2 by means of a schematically disclosed keyboard 28 or the like.

The invention is not restricted to the described embodiment but may be varied freely within the scope of the claims.

The invention claimed is:

1. A milking arrangement for animals, comprising:
   a rotary platform (2);
   a driving mechanism (12) adapted to provide a rotary motion of the platform (2);
   milking stalls (3) adapted to house the animals (1) to be milked on the platform (2); and
   a blocking system, comprising i) a movable blocking member (20, 25) adapted to temporarily block selected milking stalls (3) such that the animals (1) do not have access to the blocked milking stalls (3) during a period of time, and ii) a control unit (11) that controls motion of the blocking member (20, 25) to temporarily block the selected milking stalls (3),
   wherein the control unit i) estimates a number of animals to enter the platform (2) during a future period of time, and ii) determines, based on the control unit's estimated number of animals to enter the platform (2) during the future period of time, whether the rotary platform (2) will be used to full capacity during the future period of time, wherein,
   when the control unit determines that the rotary platform (2) will not be used to full capacity during the future period of time, i) the control system makes a determination of a number of milking stalls to be blocked during the future period of time so that a remaining number of non-blocked stalls are used substantially continuously during the future period of time, and ii) the control unit controls the motion of the blocking member to temporarily block the determined number of the milking stalls (3) during the future period of time.

2. The milking arrangement according to claim 1, wherein the control unit further controls the blocking member so that the determined number of blocked stalls are spread out around the platform in an optimal manner.

3. The milking arrangement according to claim 1, further comprising a detecting unit (26, 27), wherein the control unit is further operatively connected to the detecting unit and controls the blocking system to temporarily block the determined number of the milking stalls (3) based on the detecting unit indicating that a further selected one of the milking stalls should be blocked.

4. The milking arrangement according to claim 3, wherein the detecting unit is a detecting means that detects unhealthy animals, based on a detected quality of milk tested from an animal which has been milked in a milking stall, and when the detecting unit detects that the milked animal is an unhealthy animal, the control unit controls the blocking system to block the milking stall in which the unhealthy animal has been milked so that further animals are blocked from entered the milking stall of the unhealthy animal.

5. The milking arrangement according to claim 3, wherein the detecting unit is a detecting means that detects whether a specific animal is taking medicine, based on a detected medicine in milk tested from the specific animal which has been milked in a milking stall, and when the detecting unit detects the specific animal has the medicine in the milk, the control unit controls the blocking system to block the milking stall in which the specific animal has been milked so that further animals are blocked from entered the milking stall of the specific animal.

6. The milking arrangement according to claim 3, wherein the detecting unit is a detecting means that detects whether a component in a specific milking stall is out of order and in need of repair or replacement, and when the detecting unit detects that the component is out of order and in need of repair or replacement, the control unit controls the blocking system to block the specific milking stall so that further animals are blocked from entered the specific milking stall.

7. The milking arrangement according to claim 1, wherein the determination of whether the rotary platform (2) will be used to full capacity during the future period of time is based on the control unit's estimated number of animals to enter the platform (2) during the future period of time being less than a predetermined value.

8. The milking arrangement according to claim 1, wherein the determination of whether the rotary platform (2) will be used to full capacity during the future period of time is based on estimates of a number of animals in the waiting area (14) from a detected number of the animals entering and leaving a waiting area of the rotary platform.

9. The milking arrangement according to claim 1, wherein the determination of whether the rotary platform (2) will be used to full capacity during the future period of time is based on historical information about a visiting frequency of the animals.

10. The milking arrangement according to claim 1, wherein the determination of whether the rotary platform (2) will be used to full capacity during the future period of time is based on historical information about a visiting frequency of the animals for a corresponding period of time of day or night.

11. The milking arrangement according to claim 1, wherein the determination of whether the rotary platform (2) will be used to full capacity during the future period of time is based on statistical data for a herd of the animals.

12. The milking arrangement according to claim 1,
    wherein the blocking system (11, 20, 25) comprises said movable blocking member (20, 25) arranged in a passage (3a, 18) leading to at least one milking stall (3) on the platform (2), and
    wherein said movable blocking member (20, 25) is movably arranged between an open position, said movable blocking member (20, 25) positioned for allowing an animal (1) to enter the at least one milking stall (3), and a closed position, said movable blocking member (20, 25) positioned for preventing the animal (1) from entering the at least one milking stall (3).

13. The milking arrangement according to claim 1, wherein said movable blocking member (20) is positioned outside the platform (2) in a passage (18) leading to at least one milking stall (3) on the platform (2).

14. The milking arrangement according to claim 1, wherein said blocking member (25) is positioned on the platform (2) in a passage (3a) leading to at least one milking stall (3).

15. The milking arrangement according to claim 1, wherein the milking arrangement comprises a waiting area (14) which the animals (1) have to enter before they are allowed to enter a milking stall (3) on the platform (2).

16. The milking arrangement according to claim 15, wherein the control unit (11) estimates the number of animals to enter the milking stalls (3) during the future period of time by estimating the number of animals in the waiting area (14) using detection sensors (16, 19) which detect when an animal (1) enters and leaves the waiting area (14).

17. The milking arrangement according to claim 1, further comprising a robot arm (9) that attaches teat cups (7) to the animals (1) positioned in the milking stalls (3) on the platform (2).

18. The milking arrangement according claim 1, further comprising a cleaning device (10) to clean teat cups (7) in the milking stalls (3) between milking processes.

19. A milking arrangement for animals, comprising:
a rotary platform (2);
a driving mechanism (12) adapted to provide a rotary motion of the platform (2);
milking stalls (3) adapted to house the animals (1) to be milked on the platform (2);
a blocking member (20, 25) adapted to temporarily block selected milking stalls (3) on the platform (1) such that the animals (1) do not have access to the blocked milking stalls (3) during a period of time; and
a control unit (11) connected to control the blocking member to temporarily block the selected milking stalls (3),
the control unit that i) estimates a number of animals to enter the platform (2) during a future period of time, and ii) determines, based on the control unit's estimated number of animals to enter the platform (2) during the future period of time, whether the rotary platform (2) will be used to a predetermined capacity during the future period of time, wherein,
when the control unit determines that the rotary platform (2) will not be used to the predetermined capacity during the future period of time, i) the control system makes a determination of a number of milking stalls to be blocked during the future period of time so that a remaining number of non-blocked stalls are used substantially continuously during the future period of time, and ii) the control unit controls the blocking member to temporarily block the determined number of the milking stalls (3) during the future period of time, and
the predetermined capacity is based on the estimated number of animals to enter the platform (2) during the future period of time being less than a predetermined value.

20. A milking arrangement for animals, comprising:
a rotary platform (2);
a driving mechanism (12) adapted to provide a rotary motion of the platform (2);
milking stalls (3) adapted to house the animals (1) to be milked on the platform (2);
a blocking member (20, 25) adapted to temporarily block selected milking stalls (3) on the platform (1) such that the animals (1) do not have access to the blocked milking stalls (3) during a period of time; and
a control unit (11) connected to control the blocking member to temporarily block the selected milking stalls (3),
wherein the control unit i) estimates a number of animals to enter the platform (2) during a future period of time, and ii) determines, based on the control unit's estimated number of animals to enter the platform (2) during the future period of time, whether the rotary platform (2) will be used to a predetermined capacity during the future period of time, wherein,
when the control unit determines that the rotary platform (2) will not be used to the predetermined capacity during the future period of time, i) the control system makes a determination of a number of milking stalls to be blocked during the future period of time so that a remaining number of non-blocked stalls are used at an increased capacity during the future period of time, and ii) the control unit controls the blocking member to temporarily block the determined number of the milking stalls (3) during the future period of time.

\* \* \* \* \*